US006329996B1

(12) United States Patent
Bowen et al.

(10) Patent No.: US 6,329,996 B1
(45) Date of Patent: Dec. 11, 2001

(54) METHOD AND APPARATUS FOR SYNCHRONIZING GRAPHICS PIPELINES

(75) Inventors: Andrew D. Bowen, San Jose; Gregory C. Buchner, Los Altos; Remi Simon Vincent Arnaud, San Jose; Daniel T. Chian, Sunnyvale; James Bowman, Pescadero, all of CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/227,227

(22) Filed: Jan. 8, 1999

(Under 37 CFR 1.47)

(51) Int. Cl.[7] .............................. G06T 1/20; G06F 15/16
(52) U.S. Cl. ............................................ 345/506; 345/503
(58) Field of Search ................................... 345/501–506, 345/526

(56) References Cited

U.S. PATENT DOCUMENTS

| 5,598,525 | * | 1/1997 | Nally et al. | 345/546 |
| 5,706,415 | * | 1/1998 | Kelley et al. | 345/426 |
| 5,861,893 | * | 1/1999 | Sturgess | 345/525 |
| 5,917,502 | * | 6/1999 | Kirkland et al. | 345/505 |
| 5,995,121 | * | 11/1999 | Alcorn et al. | 345/520 |
| 5,999,183 | * | 12/1999 | Kilgariff et al. | 345/418 |
| 6,122,000 | * | 9/2000 | Yee et al. | 348/51 |
| 6,189,064 | * | 2/2001 | MacInnis et al. | 710/244 |

OTHER PUBLICATIONS

Agrawala, M. et al., "The Two–User Responsive Workbench: Support for Collaboration Through Individual Views of a Shared Space", 24th Ann. Conf. on Computer Graphics & Interactive Techniques, 1997, pp. 327–332.*

Buckelew, M., "RealiZm Graphics", Proceedings of Compcon '97, IEEE, 1997, pp. 192–197.*

Chiueh, T., and Ma, K., "A Parallel Pipelined Renderer for Time–Varying Volume Data", Third International Symposium on Parallel Architectures, Algorithms, and Networks, 1997, pp. 9–15.*

Deering, M., and Nelson, S., "Leo: A System for Cost Effective 3D Shaded Graphics", Proceedings of the 20th Annual Conference on Computer Graphics, 1993, pp. 101–108.*

Mascarenhas, R., Karumuri, D., Buy, U., and Kenyon, R., "Modeling and Analysis of a Virtual Reality System with Time Petri Nets", Proceedings of the 1998 International Conference on Software Engineering, 1998, pp. 33–42.*

Onyx2 Reality, TM Onyx2 InfiniteReality and Onyx2TM InfiniteReality2TM Technical Report, Silicon Graphics Inc., Aug. 1998.*

* cited by examiner

Primary Examiner—Ulka J. Chauhan
(74) Attorney, Agent, or Firm—Squire, Sanders & Dempsey LLP

(57) ABSTRACT

A method and apparatus for synchronizing the execution of a sequence of graphics pipelines is provided. For a representative embodiment a sequence of graphics pipelines are connected in a daisy-chain sequence. Each pipeline operation can be controlled to operated in one of two modes. The first is a local mode where the pipeline outputs its own digital video data. The second is a pass-through mode where the pipeline outputs digital video data received from preceding graphics pipelines. The pipelines are configured to allow an application executing on a host process to select the next pipeline that will enter local mode operation. The pipeline that is selected to enter local mode operation asserts a local ready signal when it is ready to begin outputting its digital video information. Each of the pipelines monitors the state of a global ready signal. When the global ready signal becomes asserted it means that the pipeline that is selected to enter local mode operation is ready. It also means that all other pipelines that are configured to work in parallel with the sequence of pipelines are ready. At this time, selected the selected pipeline enters local mode operation. The remaining pipelines in the sequence either enter or remain in pass-through mode operation.

26 Claims, 3 Drawing Sheets

METHOD AND APPARATUS FOR SYNCHRONIZING GRAPHICS PIPELINES

FIELD OF THE INVENTION

The present invention relates generally to systems for computer graphics. More specifically, the present invention includes a method and apparatus for synchronizing the sequential operation of a group of graphics pipelines.

BACKGROUND OF THE INVENTION

Computer systems (and related devices) typically create three-dimensional images using a sequence of stages known as a graphics pipeline. During early pipeline stages, images are modeled using a mosaic-like approach where each image is composed of a collection of individual points, lines and polygons. These points, lines and polygons are know as primitives and a single image may require thousands, or even millions, of primitives. Each primitive is defined in terms of its shape and location as well as other attributes, such as color and texture.

The graphics pipeline maps each primitive into a memory storage device know as a frame buffer. Each storage location within the frame buffer defines one pixel within the image being produced. The graphics pipeline performs the mapping process by determining which pixels (i.e., which frame buffer storage locations) are included within each primitive. Each pixel is then initializes to reflect the attributes of the primitive, or primitives in which it is included. In many cases, the graphics pipeline will further modify the pixel values in the frame buffer to apply texture, lighting and other effects to the graphics primitives.

The task of rendering primitives to pixels can be very time consuming. This is especially true for complex images that include many primitives or require complex lighting, shading or other effects. The time consumed transforming primitives becomes problematic for applications, such as flight simulators and virtual reality environments, where rapid image generation is required.

One method for improving the speed of the rendering process is to use multiple graphics pipelines. For this method, the task of rendering primitives is subdivided so that each pipeline performs some portion of the total task. One way of subdividing the rendering task is to assign a fixed portion of each image to a different pipeline. The pipelines operate in parallel and each pipeline processes the primitives that are included in its image portion.

The parallel output of the various pipelines is combined for display. To be effective, this combination must be accomplished seamlessly, as though the image were being created by a single graphics pipeline. In general, this seamless integration requires that the output of each pipeline be synchronized. Otherwise, the pipelines produce output at somewhat random intervals. This can make the resulting images appear to be inaccurate or even incoherent.

For some systems, the synchronization problem may be overcome through the use of a global ready signal. SILICON GRAPHICS INC. provides a signal of this type, known as SWAP_READY, for use with certain types of SGI computers. The SWAP_READY signal is physically connected to each graphics pipelines that is to be synchronized. Systems that are ready to output their image portion assert local ready signals. SWAP_READY functions as a logical AND of these local ready signal. As a result, SWAP_READY becomes asserted when all systems are ready to output their image portions. The graphics pipelines sample the state of the SWAP_READY signal on a periodic, synchronized basis. The pipelines output their image portions when the discover that SWAP_READY is high.

A second way to combine multiple graphics pipelines is to subdivide the rendering task so that the pipelines operate in round-robin or sequential fasion. For this method, each pipeline contributes a succeeding image to a sequence of images. The sequential method has certain advantages when compared to the method where each image is partitioned between pipelines. One of these advantages is the ability to use less powerful graphics pipelines to produce a sequence of images at an accelerated rate. This is especially beneficial for flight simulators and other real time environments.

To ensure image quality, sequential pipeline operation requires synchronization of the pipelines that are used to generate an image. Otherwise, there is a chance that the pipelines will output images out of order. For animation and simulation environments, this can cause the display to move unpredictably forward and backward in time. Unfortunately, a synchronization method, such as a global ready signal, is not available for systems using the sequential pipeline operation. As a result, complex software synchronization is required, increasing the difficulty of implementing systems of this type.

For some applications it is desirable to use a combination of both of the previously described techniques for combining multiple graphics pipelines. This allows images to be partitioned into regions with each region using one or more pipelines connected in sequence. The sequential operation of each group of one or more pipelines proceeds in parallel with the operation with the remaining pipeline groups. This provides a flexible method for arranging graphics pipelines to match the image generation requirements of specific applications. Unfortunately, the lack of a synchronization method for sequential pipeline operation makes combination of these systems with other graphics pipelines difficult.

Based on the preceding it may be appreciated that a need exists for an effective method for synchronizing multiple graphics pipelines that are configured to operate in a sequential fashion. A preferable solution to this problem would allow sequential graphics pipeline groups to operate in parallel with other pipeline groups.

SUMMARY OF THE INVENTION

An embodiment of the present invention includes a method and apparatus for synchronizing the operation of graphics pipelines. This method and apparatus allows graphics pipelines to be grouped for sequential operation and allows parallel execution between these pipeline groups. For a representative embodiment of the present invention, one or more graphics pipelines are connected as a daisy-chain sequence. This means that the output of each pipeline (except the last) is connected as an input to a subsequent pipeline. The output of the last pipeline is connected to a display device.

Each pipeline may be configured to operate in two different modes: local and pass-through. Pipelines operating in local mode output their own digital video data (i.e., the pixel values generated by the graphics pipelines). Pipelines operating in pass-through mode output the video data that they receive from preceding pipelines.

In operation, an application program configures the sequence of pipelines so that one pipeline operates in local mode. The remaining pipelines operate in pass-through mode. This causes the digital video output produced by the one pipeline to be passed through to the output device. At periodic intervals, the application program selects the next pipeline for operation in local mode. Shortly after the selected next pipeline becomes ready a swap event occurs. During the swap event, the selected next pipeline switches to local mode and the remaining pipeline either enter or stay in pass-through mode. In this way, the pipelines cooperate in sequential fashion to produce a sequence of images.

The timing of swap events is based on the state of a global ready signal. The global ready signal represents a logical AND of a set of local ready signals. One of these local ready signals is produced by the selected next pipeline. This local ready signal functions as the local ready signal for the entire sequence of graphics pipelines. The remaining local ready signals are provided by any graphics pipelines that are configured to work in parallel with the sequence of graphics pipelines. The global ready signal becomes asserted when each of these local ready signals is asserted. This means that the selected next pipeline, and all pipelines that are configured to work in parallel with the selected next pipeline, are ready to begin outputting video data. All of the pipelines within the sequence of pipelines monitor the state of the global ready signal. When the global ready signal becomes asserted, a swap event is initiated.

By generating the local ready signal in this fashion and using the global ready signal in this fashion, the sequence of pipelines synchronizes its own internal operation. The sequence of pipelines also operates in a mode that is compatible with the parallel operation of other graphics pipelines and groups of graphics pipelines.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to preferred embodiments of the invention, examples of which are illustrated in the accompanying drawings. Wherever convenient, the same reference numbers will be used throughout the drawings to refer to the same or like parts.

Figure 1:
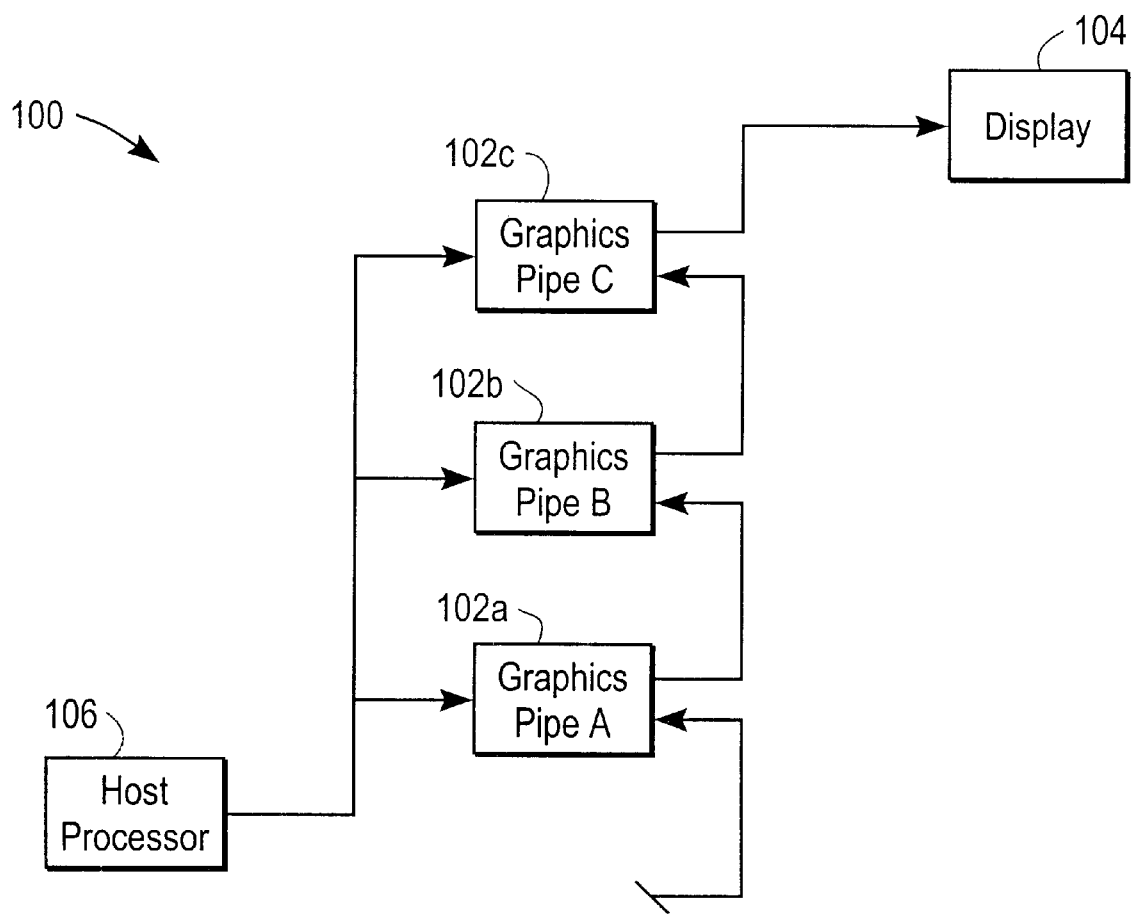
FIG. 1 is a block diagram showing three graphics pipelines configured to operate in sequence.

An embodiment of the present invention includes a method and apparatus for synchronizing the operation of graphics pipelines. This method and apparatus allows graphics pipelines to be grouped for sequential operation and allows parallel execution between these pipeline groups. In FIG. 1, a parallel rendering 100 system is shown as a representative embodiment of the present invention. Parallel rendering system 100 is intended to represent a sequential grouping of a series of similar, or dissimilar graphics pipelines. For the specific example of FIG. 1, three graphics pipelines 102a through 102c are shown. Each of these graphics pipelines 102 is intended to be representative of a wide range of different graphics pipeline types. Graphics pipelines 102 are connected as a daisy chain sequence. This means that the output of each pipeline 102 (except the last pipeline 102c) is connected as an input to a subsequent pipeline 102. The output of the last pipeline 102c is connected to display device 104.

Each pipeline 102 is connected to a host processor 106. Host processor 106 is intended to be representative of a wide range of different processor types. The connection between host processor 106 and graphics pipelines 102 is also intended to represent a wide range of different technologies such as bus interconnects and shared memory. Host processor 106 controls the execution of pipelines 102.

Under the control of host processor 106, graphics pipelines 102 produce sequences of images for display on display 104. The production of images within pipelines 102 is synchronized. This means that graphics pipelines 102 produce images in a correct ordering (i.e., preceding images do not follow subsequent images).

Figure 2:
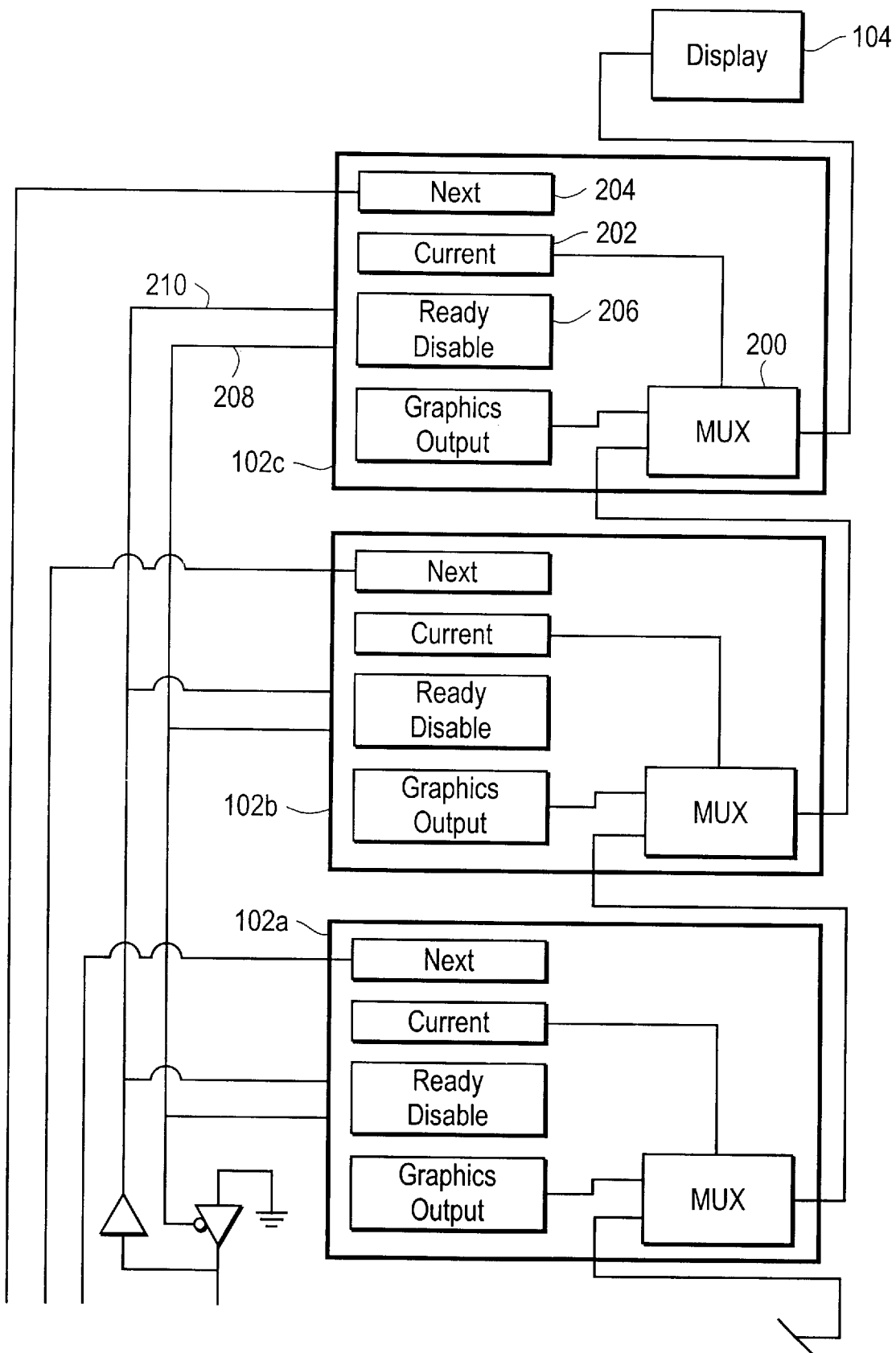
FIG. 2 is a block diagram showing the internal details of the pipeline sequence of FIG. 1.

The internal details that provide synchronized operation are better appreciated by reference to FIG. 2. In FIG. 2, it may be seen that each graphics pipeline 102 includes a multiplexer 200. Multiplexer 200 has two inputs. The first of these is the digital video output of the pipeline 102 that includes the multiplexer 200. The second input of each multiplexer (except the first) is connected to the output of the multiplexer 200 in a preceding pipeline 102. The second input of the first multiplexer 200 is connected to a null device.

Each pipeline 102 includes three state bits: a current bit 202, a next bit 204 and a ready disable bit 206. Current bit 202 directly controls the state of multiplexer 200. When current bit 202 is set, multiplexer 200 selects its first input. In this configuration, multiplexer 200 outputs the digital video output of the pipeline 102 in which it is included. For this reason, this configuration is known as local mode. When current bit 202 is not set, multiplexer 200 selects its second input. In this configuration, multiplexer 200 outputs the digital video data it receives from preceding pipelines 102. For this reason, this configuration is known as pass-through mode.

Next bit 204 contains the next value for current bit 202. As will be described in more detail, pipelines 102 transfer the value included in next bit 204 to current bit 202 as part of each swap event. In this way, each next bit 204 controls the next state (local or passthrough) of the pipeline 102 in which it is included. For the particular embodiment being described, next bit 204 is set or cleared using a command sent by host processor 106. This allows a host application to dynamically select the next pipeline 102 to output video data.

As shown in FIG. 2, pipelines 102 are each connected to produce a common local ready signal 508. A pipeline 102 selected as the next pipeline 102 (i.e., a pipeline 102 having a set next bit 204) asserts local ready signal 508 when it is ready to output its video data. Host processor 106 uses ready disable bits 206 to prevent all other pipelines 102 from asserting local ready signals 508. For the particular embodiment being described, ready disable bits 206 are set or cleared using a command sent by host processor 106.

Graphics pipelines 102 are connected to monitor the state of global ready signal 210. Global ready signal 210 is configured to act as a logical AND of its inputs. Within the example of FIG. 2 the only input for global ready signal 210 is the common local ready signal 208 produced by graphics pipelines 102. As a result, within this example, global ready signal 210 enters an asserted state whenever one of graphics pipelines 102 asserts local ready signal 208. This means that global ready signal 210 become asserted whenever a pipeline 102 having a set next bit 204 becomes ready to output its video data. Graphics pipelines 102 sample the state of global ready signal 210 on a periodic, synchronized basis. Typically, this is accomplished by connecting each graphics pipeline 102 to a periodically repeating vertical synchronization signal. Using this system, the synchronization subsystems sample global ready signal 210 at the beginning of each pulse of the vertical synchronization signal.

When graphics pipelines 102 discover that global ready signal 210 is in the asserted state, they initiate a swap event. During the swap event, each graphics pipeline 102 moves the value stored in its next bit 204 into its current bit 202. Each graphics pipeline 102 also clears its next bit 204. If the movement of next bit 204 sets current bit 202, multiplexer 200 enters local mode operation. In all other cases, multiplexer 200 either enters or stays in pass-through mode.

During operation, an application process, executing on host processor 106, allocates graphics primitives to at least some of the pipelines 102. The primitives correspond to a series of images that are to be generated by pipelines 102. The host application then selects the pipeline 102 that is to render the first image portion 202. The host application then sends commands to graphics pipelines 102 to set the next bit in the selected pipeline 102. The commands also set the disable ready bits in the remaining pipelines.

When the selected graphics pipeline 102 finishes rendering its graphics primitives, it asserts local swap ready 208. This causes global swap ready 210 to enter an asserted state. At the beginning of the next vertical sync pulse, the selected graphics pipelines 102 and all other graphics pipelines 102 sample global ready signal 210. Since global ready signal is asserted, a swap event is initiated.

During the swap event, each graphics pipeline moves its next bit 204 to its current bit 202. In the case of the selected graphics pipeline, next bit 204 is set. This causes the selected graphics pipeline 102 to enter local mode operation. The remaining graphics pipelines 102 have clear next bits 204. This causes these pipelines 102 to either enter or remain in pass-through mode operation.

Host processor 106 continues the rendering process by repeatedly setting appropriate next bits 204 and appropriate ready disable bits 206. Host processor may also allocate new primitives to pipelines 102 that have completed rendering and outputting their video data. In this way, the present invention provides a flexible synchronization mechanism that allows a software application to selectively control the order or execution for pipelines 102.

Figure 3:
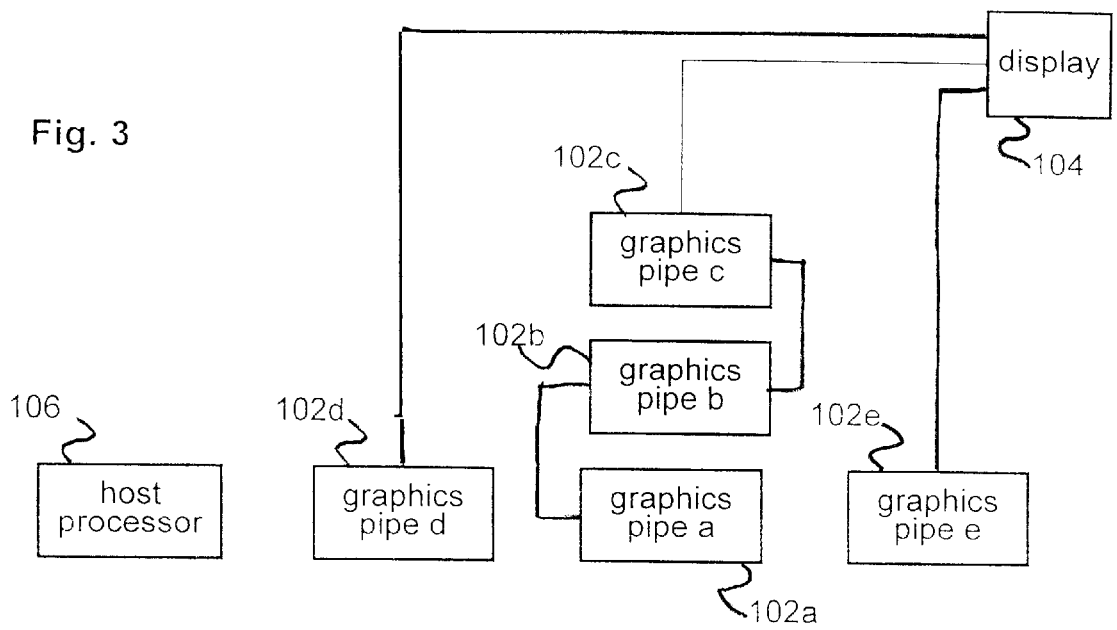
FIG. 3 is a block diagram showing the pipeline sequence of FIG. 1 operating in parallel with two graphics pipelines.

The present invention also provides for synchronized execution between sequences of graphics pipelines (such as the sequence of graphics pipelines 102 shown in FIG. 2) and graphics pipelines that are configured to work in parallel with sequences of this type. An example of this type of configuration is shown in FIG. 3. FIG. 3, includes the three sequential pipelines 102a–102c of FIG. 2. In this case, however, two additional graphics pipelines 102d and 102e are configured for parallel operation with the sequence of pipelines 102a–102c.

Figure 4:
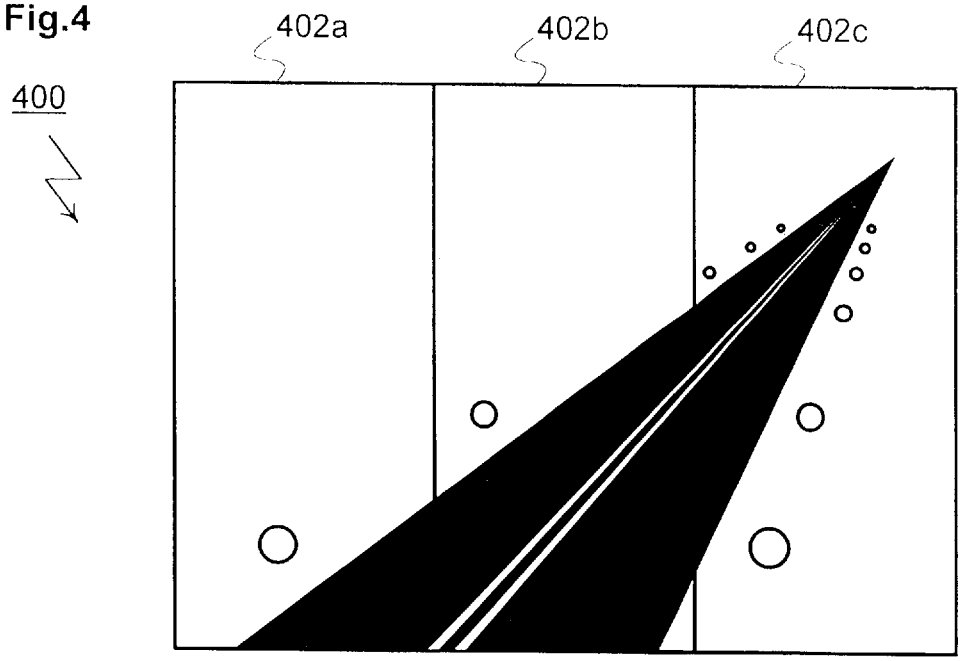
FIG. 4 is a block diagram showing a single image divided into three image portions.

For the purposes of this example, it is assumed that each that the three sequential pipelines 102a–102c produce a series of images for a portion of display 104. The remaining pipelines 102d and 102e each provide images for additional portions of display 104. This can be appreciated by reference to FIG. 4 where a sample image 400 is shown. Sample image 200 is subdivided into three portions 402a through 402c. For the purposes of the example of FIG. 3, it may be assumed that these portions 202 are contributed by the three sequential pipelines 102a–102c, pipeline 102d and 102e, respectively.

Synchronization between the three sequential pipelines 102a–102c and pipelines 102d and 102e is achieved by configuring pipelines 102d and 102e to provide local swap ready signals when they are ready to output their video data. This ensures that the three sequential pipelines 102a–102c will not begin swap event processing before pipelines 102d and 102e are ready. Pipelines 102d and 102e are also required to delay swap event processing until global ready signal 210 is asserted. This ensures that pipelines 102d and 102e will not begin swap event processing before the three sequential pipelines 102a–102c are ready. In this way, the present allows pipelines grouped in sequence to operate in parallel with other pipelines and groups of pipelines.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for synchronizing the operation of a sequence of graphics pipelines with a global ready signal, the method comprising:

designating, by a host processor, a next graphics pipeline within the sequence of graphics pipelines;

waiting, by the next graphics pipeline, until the next graphics pipeline is ready to output video data to be produced by the next graphics pipeline;

asserting, by the next graphics pipeline, a local ready signal indicating that the next graphics pipeline is ready to output video data;

waiting, by the next graphics pipeline, until the global ready signal enters an asserted state;

outputting, by the next graphics pipeline, video data produced by the next graphics pipeline; and enabling other graphics pipelines within the sequence of graphics pipelines that are not the next graphics pipelines to pass through the video data produced by the next graphics pipeline.

2. A method as recited in claim 1, further comprising, performed by the host processor, disabling the assertion of local ready signals by graphics pipelines within the sequence of graphics pipelines that are not the next graphics pipeline.

3. A method as recited in claim 1, wherein the global ready signal is formed as a logical AND of the local ready signal and other local ready signals produced by other graphics pipelines.

4. A method as recited in claim 1, wherein the global ready signal is formed as a logical AND of the local ready signal and other local ready signals produced by other sequences of graphics pipelines.

5. A method as recited in claim 1, wherein the graphics pipelines are connected to monitor the state of a periodically repeating vertical synchronization signal and where the step of waiting, by the next graphics pipeline, until the global ready signal enters an asserted state further comprises sampling the global synchronization at the start of each pulse of the vertical synchronization signal.

6. A method as recited in claim 1, wherein each graphics pipeline in the sequence of graphics pipelines has an associated next bit, and wherein the step of designating, by a host processor, a next graphics pipeline further comprises setting, by the host processor, the next bit for the next graphics pipeline, with the next bit controlling the next state of the next graphics pipeline video data or to permit to pass through video data produced by a preceding next graphics pipeline.

7. A method for synchronizing the operation of a sequence of graphics pipelines with a global ready signal, the method comprising:

designating, by a host processor, a next graphics pipeline within the sequence of graphics pipelines;

waiting, by the next graphics pipeline, until the next graphics pipeline is ready to output video data;

asserting, by the next graphics pipeline, a local ready signal indicating that the next graphics pipeline is ready to output video data;

waiting, by the next graphics pipeline, until the global ready signal enters an asserted state, wherein the global ready signal is formed as a logical AND of the local ready signal and other local ready signals produced by other graphics pipelines; and outputting, by the next graphics pipeline, video data.

8. A method as recited in claim 7, further comprising, performed by the host processor, disabling the assertion of local ready signals by graphics pipelines within the sequence of graphics pipelines that are not the next graphics pipeline.

9. A method as recited in claim 7, wherein the graphics pipelines are connected to monitor the state of a periodically repeating vertical synchronization signal and where the step of waiting, by the next graphics pipeline, until the global ready signal enters an asserted state further comprises sampling the global synchronization at the start of each pulse of the vertical synchronization signal.

10. A method as recited in claim 7, wherein each graphics pipeline in the sequence of graphics pipelines has an associated next bit, and wherein the step of designating, by a host processor, a next graphics pipeline further comprises setting, by the host processor, the next bit for the next graphics pipeline.

11. A method for synchronizing the operation of a sequence of graphics pipelines with a global ready signal, the method comprising the steps of:

designating, by a host processor, a next graphics pipeline within the sequence of graphics pipelines;

waiting, by the next graphics pipeline, until the next graphics pipeline is ready to output video data to be produced by the next graphics pipeline;

asserting, by the next graphics pipeline, a local ready signal indicating that the next graphics pipeline is ready to output video data;

disabling, by a host processor, the assertion of local ready signals by graphics pipelines within the sequence of graphics pipelines that are not the next graphics pipeline;

waiting, by the next graphics pipeline, until the global ready signal enters an asserted state;

outputting, by the next graphics pipeline, video data produced by the next graphics pipeline; and enabling other graphics pipelines within the sequence of graphics pipelines that are not the next graphics pipelines to pass through the video data produced by the next graphics pipeline.

12. A method as recited in claim 11, wherein the global ready signal is formed as a logical AND of the local ready signal and other local ready signals produced by other graphics pipelines.

13. A method as recited in claim 11, wherein the graphics pipelines are connected to monitor the state of a periodically repeating vertical synchronization signal and where the step of waiting, by the next graphics pipeline, until the global ready signal enters an asserted state further comprises sampling the global synchronization at the start of each pulse of the vertical synchronization signal.

14. A method as recited in claim 11, wherein each graphics pipeline in the sequence of graphics pipelines has an associated next bit, and wherein the step of designating, by a host processor, a next graphics pipeline further comprises setting, by the host processor, the next bit for the next graphics pipeline, with the next bit controlling the next state of the next graphics pipeline video data or to permit to pass through video data produced by a preceding next graphics pipeline.

15. A method for synchronizing the operation of a sequence of graphics pipelines with a global ready signal, the method comprising the steps of:

designating, by a host processor, a next graphics pipeline within the sequence of graphics pipelines;

waiting, by the next graphics pipeline, until the next graphics pipeline is ready to output video data to be produced by the next graphics pipeline;

asserting, by the next graphics pipeline, a local ready signal indicating that the next graphics pipeline is ready to output video data;

waiting, by the next graphics pipeline, until the global ready signal enters an asserted state;

outputting, by the next graphics pipeline, video data produced by the next graphics pipeline; and enabling other graphics pipelines within the sequence of graphics pipelines that are not the next graphics pipelines to pass through the video data produced by the next graphics pipeline;

wherein the global ready signal is formed as a logical AND of the local ready signal and other local ready signals produced by other sequences of graphics pipelines.

16. A method as recited in claim 15, further comprising, performed by the host processor, disabling the assertion of local ready signals by graphics pipelines within the sequence of graphics pipelines that are not the next graphics pipeline.

17. A method as recited in claim 15, wherein the global ready signal is formed as a logical AND of the local ready signal and other local ready signals produced by other graphics pipelines.

18. A method as recited in claim 15, wherein the graphics pipelines are connected to monitor the state of a periodically repeating vertical synchronization signal and where the step of waiting, by the next graphics pipeline, until the global ready signal enters an asserted state further comprises the step of sampling the global synchronization at the start of each pulse of the vertical synchronization signal.

19. A method as recited in claim 15, wherein each graphics pipeline in the sequence of graphics pipelines has an associated next bit, and wherein the step of designating, by a host processor, a next graphics pipeline further comprises the step of setting, by the host processor, the next bit for the next graphics pipeline.

20. An electronically-readable medium having stored thereon computer-readable code to permit a computer to effect a method for synchronizing the operation of:

designating, by a host processor, a next graphics pipeline within the sequence of graphics pipelines;

waiting, by the next graphics pipeline, until the next graphics pipeline is ready to output video data to be produced by the next graphics pipeline;

asserting, by the next graphics pipeline, a local ready signal indicating that the next graphics pipeline is ready to output video data;

waiting, by the next graphics pipeline, until the global ready signal enters an asserted state;

outputting, by the next graphics pipeline, video data produced by the next graphics pipeline; and enabling other graphics pipelines within the sequence of graphics pipelines that are not the next graphics pipelines to pass through the video data produced by the next graphics pipeline.

21. An electronically-readable medium having stored thereon computer-readable code to permit a computer to effect a method for synchronizing the operation of:

designating, by a host processor, a next graphics pipeline within the sequence of graphics pipelines;

waiting, by the next graphics pipeline, until the next graphics pipeline is ready to output video data to be produced by the next graphics pipeline;

asserting, by the next graphics pipeline, a local ready signal indicating that the next graphics pipeline is ready to output video data;

disabling, by a host processor, the assertion of local ready signals by graphics pipelines within the sequence of graphics pipelines that are not the next graphics pipeline;

waiting, by the next graphics pipeline, until the global ready signal enters an asserted state;

outputting, by the next graphics pipeline, video data produced by the next graphics pipeline; and enabling other graphics pipelines within the sequence of graphics pipelines that are not the next graphics pipelines to pass through the video data produced by the next graphics pipeline.

22. An electronically-readable medium having stored thereon computer-readable code to permit a computer to effect a method for synchronizing the operation of:

designating, by a host processor, a next graphics pipeline within the sequence of graphics pipelines;

waiting, by the next graphics pipeline, until the next graphics pipeline is ready to output video data to be produced by the next graphics pipeline;

asserting, by the next graphics pipeline, a local ready signal indicating that the next graphics pipeline is ready to output video data;

waiting, by the next graphics pipeline, until the global ready signal enters an asserted state; and outputting, by the next graphics pipeline, video data produced by the next graphics pipeline; and enabling other graphics pipelines within the sequence of graphics pipelines that are not the next graphics pipelines to pass through the video data produced by the next graphics pipeline;

wherein the global ready signal is formed as a logical AND of the local ready signal and other local ready signals produced by other sequences of graphics pipelines.

23. A parallel rendering system, comprising:

a host processor;

coupled to the host processor, a first graphics pipeline configured to produce video data;

coupled to the host processor and first graphics pipeline, a second graphics pipeline configured to receive video data produced by a preceding graphics pipeline and to produce video data;

the host processor configured to set the first graphics pipeline to output video data produced by the first graphics pipeline or to set the first graphics pipeline to pass through video data produced by the second graphics pipeline;

the host processor configured to set the second graphics pipeline to output video data produced by the second graphics pipeline or to set the second graphics pipeline to pass through video data produced by the preceding graphics pipeline.

24. A system for synchronizing the operation of a sequence of graphics pipelines with a global ready signal, the system comprising:

means for designating a next graphics pipeline within the sequence of graphics pipelines;

means for waiting until the next graphics pipeline is ready to output video data to be produced by the next graphics pipeline;

means for asserting a local ready signal indicating that the next graphics pipeline is ready to output video data;

means for disabling the assertion of local ready signals by graphics pipelines within the sequence of graphics pipelines that are not the next graphics pipeline;

means for waiting until the global ready signal enters an asserted state;

means for outputting video data produced by the next graphics pipeline; and means for enabling other graphics pipelines within the sequence of graphics pipelines that are not the next graphics pipelines to pass through the video data produced by the next graphics pipeline.

25. A system for synchronizing the operation of a sequence of graphics pipelines with a global ready signal, the system comprising:

means for designating a next graphics pipeline within the sequence of graphics pipelines;

means for waiting until the next graphics pipeline is ready to output video data;

means for asserting a local ready signal indicating that the next graphics pipeline is ready to output video data;

means for waiting until the global ready signal enters an asserted state, wherein the global ready signal is formed as a logical AND of the local ready signal and other local ready signals produced by other graphics pipelines; and means for outputting video data.

26. A system for synchronizing the operation of a sequence of graphics pipelines with a global ready signal, the system comprising:

means for designating a next graphics pipeline within the sequence of graphics pipelines;

means for waiting until the next graphics pipeline is ready to output video data to be produced by the next graphics pipeline;

means for asserting a local ready signal indicating that the next graphics pipeline is ready to output video data;

means for waiting until the global ready signal enters an asserted state;

means for outputting, by the next graphics pipeline, video data produced by the next graphics pipeline; and means for enabling other graphics pipelines within the sequence of graphics pipelines that are not the next graphics pipelines to pass through the video data produced by the next graphics pipeline.

* * * * *